(12) United States Patent
De Bree (10) Patent No.: US 10,362,722 B2
(45) Date of Patent: Jul. 30, 2019

(54) SOIL PROCESSING DEVICE (71) Applicant: REDEXIM HANDEL—EN EXPLOITATIE MAATSCHAPPIJ B.V., AC Zeist (NL)

(72) Inventor: Cornelius Hermanus Maria De Bree, AC Zeist (NL)

(73) Assignee: REDEXIM HANDEL-EN EXPLOITATIE MAATSCHAPPIJ B.V., AC Zeist (NL)

(*) Notice: Subject to any disclaimer, the term of this patent is extended or adjusted under 35 U.S.C. 154(b) by 0 days.

(21) Appl. No.: 15/311,565

(22) PCT Filed: May 18, 2015

(86) PCT No.: PCT/EP2015/060900
§ 371 (c)(1),
(2) Date: Nov. 16, 2016

(87) PCT Pub. No.: WO2015/173431
PCT Pub. Date: Nov. 19, 2015

(65) Prior Publication Data
US 2017/0094888 A1  Apr. 6, 2017

(30) Foreign Application Priority Data
May 16, 2014  (EP) .................................... 14168659

(51) Int. Cl.
A01B 61/04  (2006.01)
A01B 45/02  (2006.01)

(52) U.S. Cl.
CPC .......... A01B 45/023 (2013.01); A01B 61/046 (2013.01)

(58) Field of Classification Search
CPC ...... A01B 45/023; A01B 61/04; A01B 61/046
USPC .................. 172/21, 233, 264, 265, 705, 710
See application file for complete search history.

(56) References Cited

U.S. PATENT DOCUMENTS

| 3,797,577 A | * | 3/1974 | Killion | A01B 45/023 172/22 |
| 4,658,909 A | * | 4/1987 | McDermott | A01B 45/023 172/22 |
| 5,787,992 A | * | 8/1998 | Dobson | A01B 61/046 172/264 |

(Continued)

FOREIGN PATENT DOCUMENTS

| DE | 102005021025 A1 | 10/2006 |
| EP | 0037595 A1 | 10/1981 |

(Continued)

OTHER PUBLICATIONS

International Search Report and the Opinion dated Sep. 4, 2015 from corresponding International Patent Application No. PCT/EP2015/060900; 12 pgs.

*Primary Examiner* — Gary S Hartmann
(74) *Attorney, Agent, or Firm* — Maier & Maier, PLLC (57) ABSTRACT A drivable soil working device including a machine frame, a drive, at least one support arm which can be moved up and down by the drive and which is mounted on the machine frame in a pivotal manner, and at least one insertion tool which can be pivoted relative to the support arm about a first pivot axis and which can be moved up and down by means of the support arm. The insertion tool can be inserted into the soil and withdrawn.

12 Claims, 5 Drawing Sheets (56) References Cited

U.S. PATENT DOCUMENTS

| | | | |
|---|---|---|---|
| 6,003,613 A * | 12/1999 | Reincke | A01B 45/023 172/21 |
| 8,291,992 B2 * | 10/2012 | de Bree | A01B 45/023 172/21 |
| 9,402,339 B2 * | 8/2016 | De Bree | A01B 45/023 |
| 9,686,898 B2 * | 6/2017 | De Bree | A01B 45/023 |
| 2010/0288518 A1 | 11/2010 | Reincke | |
| 2010/0294523 A1 | 11/2010 | Wiedenmann | |
| 2011/0042113 A1 | 2/2011 | De Bree | |

FOREIGN PATENT DOCUMENTS

| | | |
|---|---|---|
| EP | 2014146 A1 | 1/2009 |
| EP | 2106679 A1 | 10/2009 |
| EP | 2123143 A1 | 11/2009 |

* cited by examiner

SOIL PROCESSING DEVICE

FIELD

The present invention relates to a mobile soil working device, as well as to a method for working soil.

BACKGROUND

Soil working devices are known from prior art which comprise at least one machine frame, a drive and at least one support arm adapted to be moved up and down by the drive and pivotably supported at the machine frame. The soil working devices further comprise at least one insertion tool adapted to be pivoted about a first pivot axis relative to the support arm and to be moved upward and downward by means of the support arm, the insertion tool being adapted to be inserted into the soil and be pulled out from the same. Prior to insertion into the soil, the insertion tool is in a initial position under a predetermined insertion angle and, due to the movement of the machine frame in the traveling direction, performs a pivot movement in the soil about a first pivot axis in the direction of a first pivoting direction, the pivot movement superposing the upward and downward movement. Further, the soil working device comprises at least one returning means that is coupled to the insertion tool at a first end and is coupled to the returning means at the second end, wherein the returning means, after the insertion tool has left the soil, returns the insertion tool to the initial position by pivoting the insertion tool in a second pivoting direction opposite to the first pivoting direction.

From European Patent Publication EP-A-0037595 a soil working device is known that has two carrying arms guided in a parallelogram-like manner and pivotably supporting a tool holder at one end, while the other end of the arms is pivotably supported at a machine frame. A pushrod of a crank drive is hinged to the tool holder and drives the same so that it performs an up and down movement. One of the two support arms is variable in length and comprises a stop spring means. As soon as the insertion tool is outside the soil, the support arm is pulled to the stop by the spring force. With the insertion tool inserted and the soil working device moving forward, the tool with the tool holder pivots against the traveling direction and the length-variable support arm is extended against the spring force.

However, the previously known soil working devices have the drawback that the insertion tools may be damaged when they hit a hard object in the soil, such as a stone, for example. Further, there is a need for the manufacture of machines that are as light-weight as possible.

SUMMARY

Therefore, it is an object of the present invention to provide a soil working device and a method for working a soil surface, in which the soil working device is protected against damage when the at least one insertion tool hits a hard object in the soil, wherein the soil working device can be manufactured in a simple and economic manner.

The invention advantageously provides that the returning means comprises a spring means in addition to the returning element, the spring means allowing the insertion tool to be pivoted in the second pivoting direction beyond the initial position so that, when hitting a hard object in the soil, the insertion tool can be pivoted beyond the initial position by pivoting the insertion tool in the second pivoting direction. This is advantageous in that the insertion tool can evade the hard object in the soil also in the second pivoting direction, although the insertion tool already is in the initial position. In this manner it can be prevented that the insertion tools are damaged. Due to the fact that the spring means which allows the insertion tool to be pivoted beyond the initial position in the second pivoting direction, is arranged in the returning means, previously used soil working devices can easily be retrofitted by replacing the previously used returning means by the returning means of the present invention.

Further, the soil working device of the present invention becomes only slightly heavier than a previously known soil processing device.

When being pivoted beyond the initial position in the second pivoting direction, the insertion tool may be pivotable against the spring force of the spring means.

This has the advantage that, as soon as the obstacle in the soil has been overcome and the insertion tool leaves the soil again, the insertion tool is pivoted into the initial position by the spring force of the spring means. In this way, the operation of the soil working device does not have to be interrupted when an insertion tool hits a hard object.

The spring force of the spring means may be chosen such that the spring means allows the insertion tool to be moved beyond the initial position only when a force is exerted on the insertion tool that exceeds a predetermined force.

Thus, the spring means is not actuated during normal operation. Only when the insertion toll hits a hard object in the soil and the insertion tool already is in the initial position, can the insertion tool pivot farther in the second pivoting direction beyond the initial position and thereby actuate the spring means.

The spring force of the spring means may be adjustable. For example, another spring may be chosen or the spring may be pre-tensioned differently.

The returning means may have a stop that limits the pivotal movement of the insertion means in the second pivoting direction when the initial position is reached or during normal operation.

The returning element may be a spring, preferably a compression spring.

The returning means may be a piston-cylinder unit. This piston-cylinder unit may be telescopable.

The returning means designed as a piston-cylinder unit may extend substantially in parallel with the support arm. In this manner, the returning means designed as a piston-cylinder unit and the support arm form a sort of parallelogram.

The spring means may be a compression spring.

The returning means may be coupled to the machine frame via an adjustment means, wherein the adjustment means allows the adjustment of the insertion angle in the initial position of the insertion tool.

At least one tool holder may be provided for the at least one insertion tool, which tool holder is supported in the support arm for pivotal movement about the first pivot axis, the support arm being adapted to be moved up and down by the drive.

A plurality of insertion tools may be mounted to the tool holder.

A plurality of tool holders may be arranged side by side, each having a plurality of insertion tools fastened thereto, wherein a respective returning means is provided per tool holder and is connected with the respective tool holder.

According to the present invention a method for working soil may further be provided, the method comprising the following steps:

pulling or driving a soil working device over a soil surface, inserting at least one insertion tool, coupled to a machine frame, into the soil and pulling it out of the soil, wherein, prior to insertion, the insertion tool is in an initial position under a predetermined insertion angle and, due to the movement of the machine frame in the traveling direction, performs a pivot movement in the soil about a first pivot axis in the direction of a first pivoting direction, the pivot movement superposing the upward and downward movement, wherein the insertion tool, after having left the soil, is returned to the initial position by at least one returning element arranged in at least one returning means, by pivoting the insertion tool in a second pivoting direction opposite to the first pivoting direction, wherein the returning means is coupled to the machine frame at a first end and is coupled to the insertion tool at a second end.

In such a method it is advantageously provided that a spring means arranged in the returning means allows a pivoting of the insertion tool beyond the initial position in the second pivoting direction, when the tool hits a hard object in the soil.

When being pivoted beyond the initial position in the second pivoting direction, the insertion tool may be pivoted against the spring force of the spring means. The insertion tool may be pivoted beyond the initial position when a force is exerted on the insertion tool that exceeds a predetermined force.

BRIEF DESCRIPTION OF THE DRAWINGS

The following is a detailed description of an embodiment of the invention with reference to the drawings.

The Figures schematically show.

DETAILED DESCRIPTION

Figure 1:
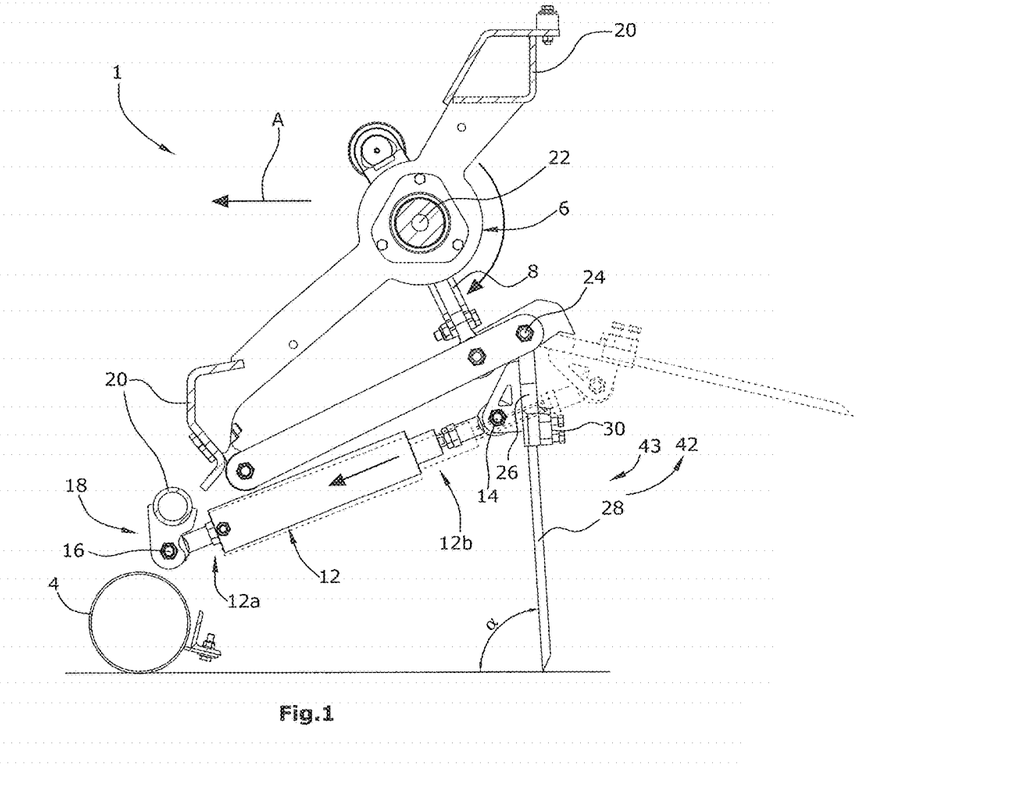
FIG. 1 a soil working device in side view prior to insertion of the insertion tool, FIG. 2 the soil working device of FIG. 1 with the insertion tool inserted, FIG. 3 the soil working device of FIGS. 1 and 2 with the insertion tool pivoted, FIG. 4 the soil working device of FIGS. 1 to 3 when the insertion tool hits a hard object, FIG. 5 a sectional view of the returning means in the initial position, FIG. 6 a sectional view of the returning means with the insertion tool pivoted, FIG. 7 a sectional view of the returning means in which the insertion tool has been pivoted beyond the initial position in the second pivoting direction.

FIG. 1 shows a soil working device 1 in side view. The soil working device 1 has wheels 4 and a coupling means not illustrated herein that is connected with a machine frame 20. Using the coupling means, the soil working device 1 can be coupled to a traction vehicle and be pulled by the traction vehicle. As an alternative, the soil working device 1 may be self-propelled.

The soil working device 1 comprises the machine frame 20. The soil working device 1 further comprises a drive 6 as well as at least one support arm 10 pivotably supported at the machine frame 20 and adapted to be moved up and down by the drive 6. The support arm 10 can be driven by the drive 6 via a pushrod 8. At a first end, the support arm 10 is supported at the machine frame 20 for pivotal movement about a pivot axis 24. The pushrod 8 is connected with the support arm 10 via a hinge 44. In the embodiment illustrated the drive 6 is a crank drive. The drive 6 drives the pushrod 8 which in turn drives the support arm 10 so that the same is moved up and down and pivots about the pivot axis 24.

At the second end of the support arm 10, a tool holder 26 is fastened for pivotal movement about a first pivot axis 24. At least one insertion tool, preferably a plurality of insertion tools 28 is connected to the tool holder 26. The insertion tools 28 may be connected with the tool holder 26 by means of a fastening means 30. The at least one insertion tool 28 is thus coupled to the support arm 10 and can pivot relative to the support arm 10. (FIG. 1 may depict an insertion tool 28 that is provided in a pivoted direction, which may be depicted with a dotted line.) Further, the at least one insertion tool 28 can be moved up and down by means of the support arm 10, the insertion tool 28 being adapted to be inserted into the soil 2 and be pulled out of the same again.

Further, the soil working device 1 has at least one returning means 12 coupled to the machine frame 20 at a first end 12a and to the insertion tool 28 at a second end 12b. In the embodiment illustrated the returning means 12 is coupled to the machine frame 20 at the first end 12a via an adjustment means 18, the returning means 12 being pivotably coupled to the adjustment means via a pivot axis 16.

At the second end 12b, the returning means 12 is connected with the tool holder 26 via a pivot axis 14 and is thereby coupled to the at least one insertion tool 28.

Figure 2:
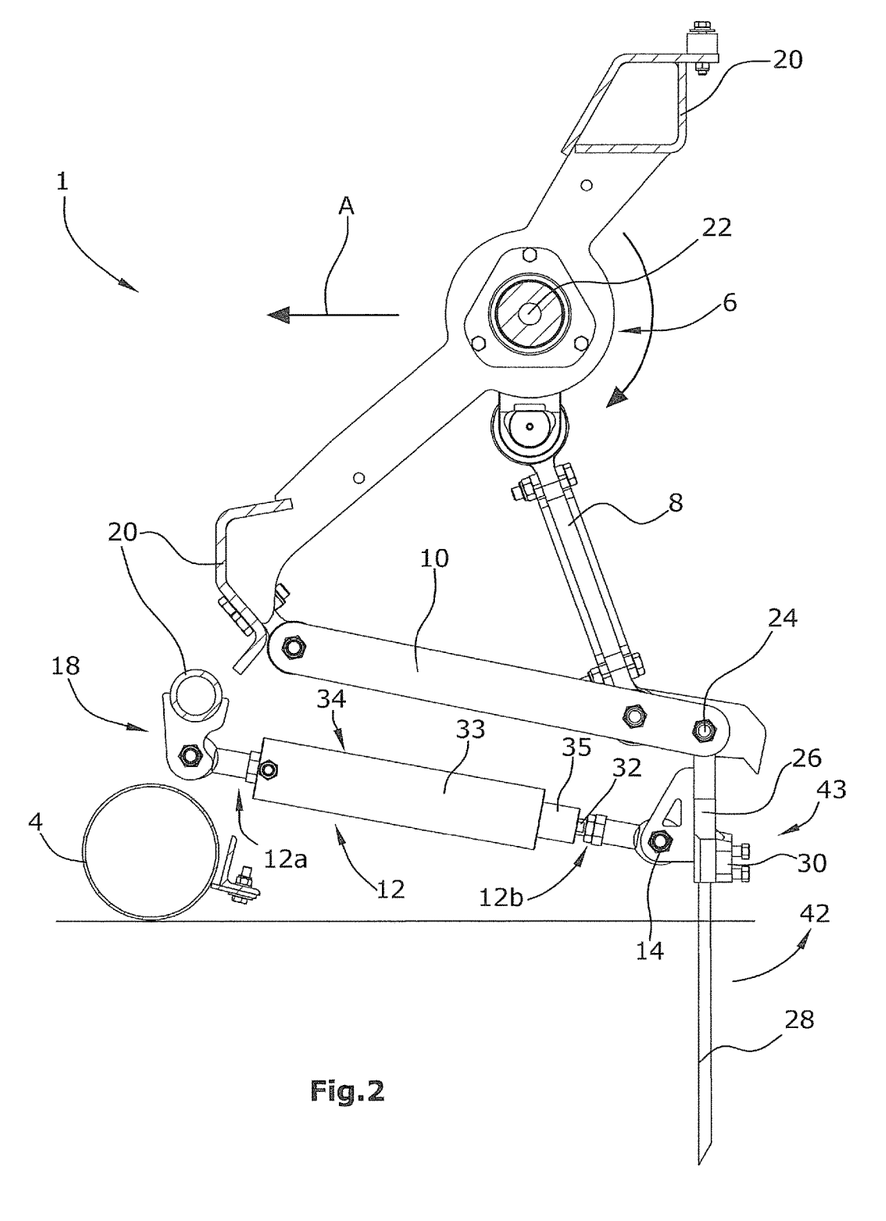

FIG. 1 illustrates an operating state in which the insertion tool 28 is in a state just prior to insertion into the soil. Prior to insertion into the soil, the insertion tool 28 is in an initial position under a predetermined insertion angle α. When the support arm 10 is pivoted down by the drive 6, the insertion tool 28 is inserted into the soil. This state is illustrated in FIG. 2. Due to the movement of the machine frame 20 in the traveling direction A, the insertion tool 28 performs a pivot movement in the soil 2 about a first pivot axis 24 in a first pivoting direction 42, the pivot movement superposing the upward and downward movement.

Figure 3:
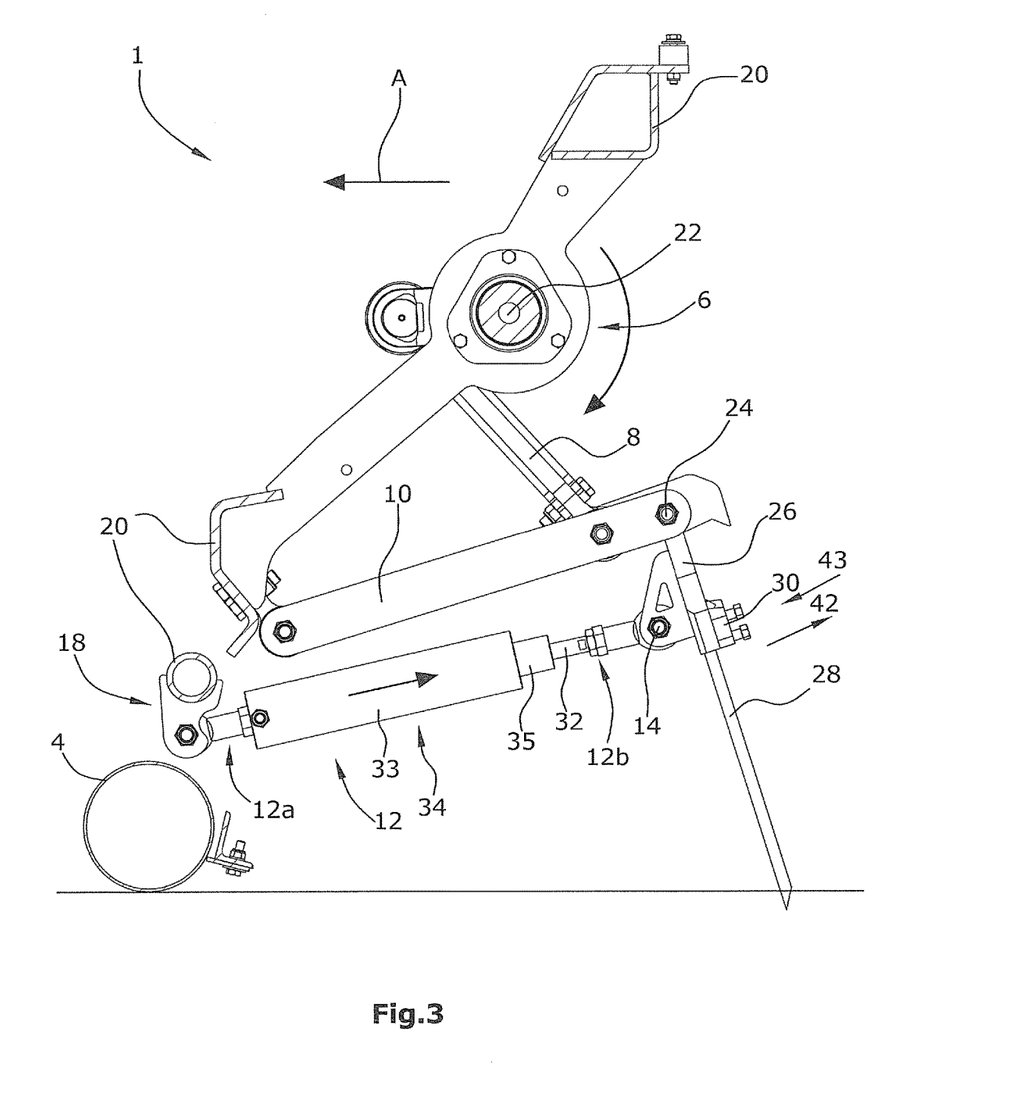

FIG. 3 illustrates the state in which the insertion tool has been pivoted in the first pivoting direction 42 and has been moved upward again by the drive 6.

The returning means 12 has at least one returning element which moves the insertion tool 28 back into the initial position by pivoting the insertion tool in a second pivoting direction 43 opposite the first pivoting direction 42 after the insertion tool exits the soil 2.

In the embodiment illustrated the returning means 12 may be a piston-cylinder unit. Here, the returning means 12 has a piston rod 32 which exits from the cylinder unit 34 during a pivot movement in the first pivoting direction 42. The returning means 12 is thus variable in length. Further, the returning means 12 preferably is arranged substantially parallel to the support arm 10, whereby the returning means 12 and the support arm 10 have a parallelogram-like configuration.

Figure 4:
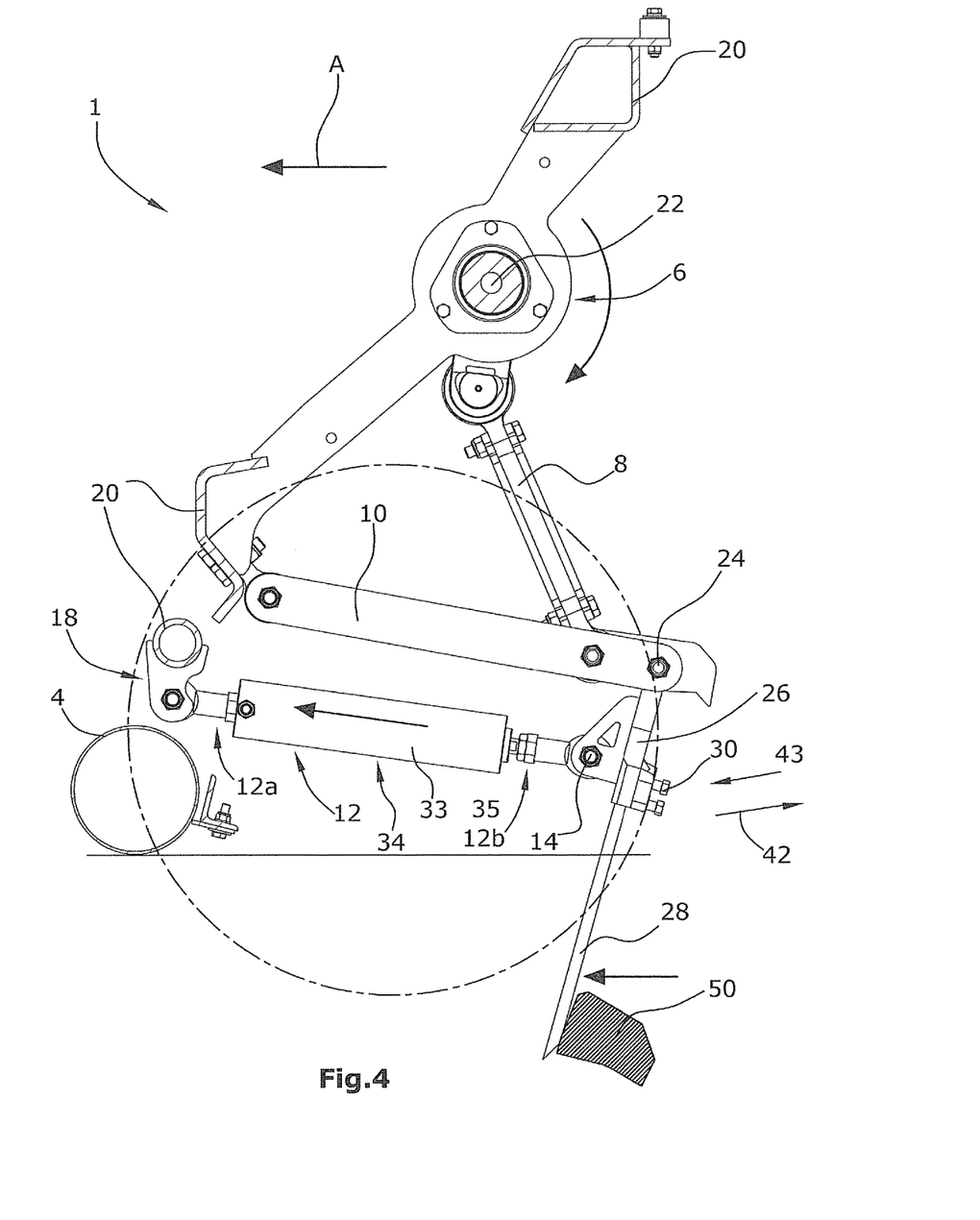

The returning means 12 may comprise a spring means in addition to the returning element, allowing the insertion tool 28 to be pivoted in the second pivoting direction 43 beyond the initial position so that, when hitting a hard object in the soil 2, such as a stone 50, the insertion tool can be pivoted by pivoting the insertion tool 28 beyond the initial position in the second pivoting direction 43. FIG. 4 illustrates a stat in which the insertion tool 28 hits a hard object, such as a stone 50. The insertion tool 28 can now pivot farther in the second pivoting direction 43, whereby the piston rod 32 is moved farther into the cylinder unit 34. The insertion tool 28 can thus evade the hard object 50, as illustrated in FIG. 4.

As soon as the obstacle in the soil 2 has been overcome and the insertion tool 28 has been pulled out of the soil 2 again, the spring means 52 can return the insertion tool back into the initial position.

Figure 5:
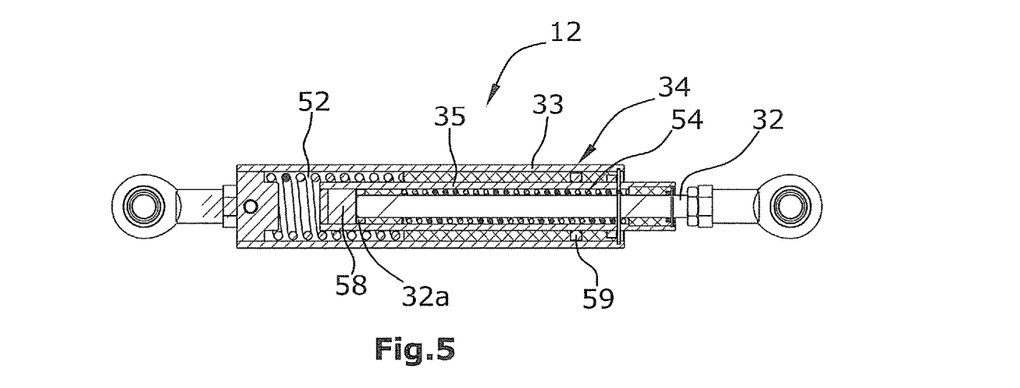
Figure 6:
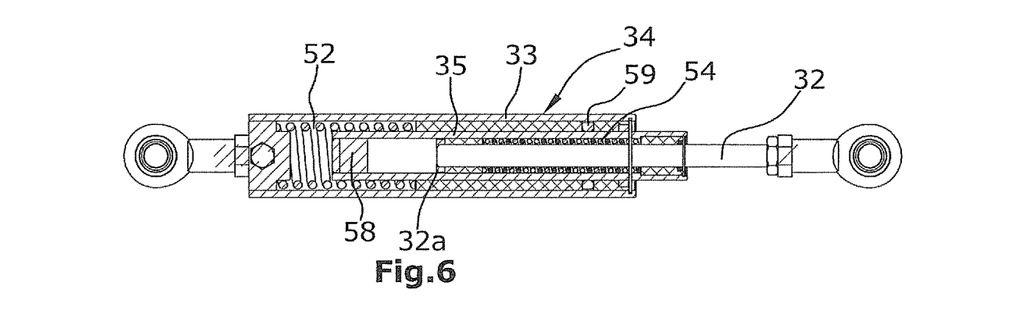
Figure 7:
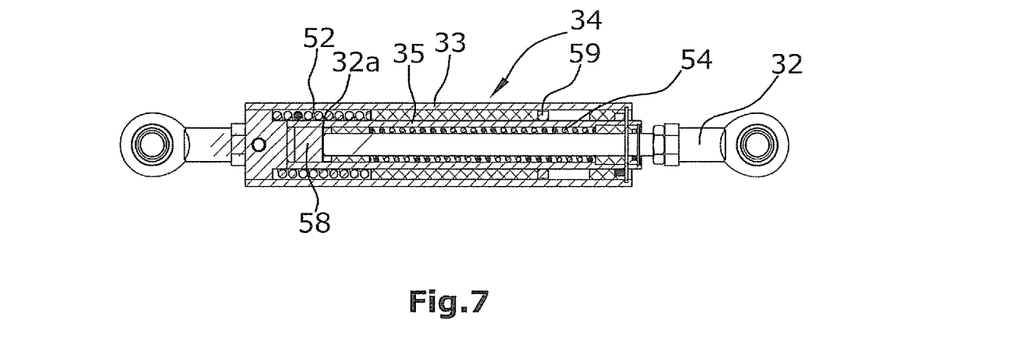

FIGS. 5-7 show the returning means 12 in more detail. As can be seen in FIGS. 5-7, the returning means 12 has a returning element 54 by which the insertion tool is moved back into the initial position by pivoting the insertion tool 28 in the second pivoting direction 43 opposite the first pivoting direction 42 after the insertion tool exits the soil 2. In the embodiment illustrated the returning element 54 is a spring, preferably a compression spring.

The returning spring 12 is a piston-cylinder unit. The same comprises a piston rod 32 and a cylinder unit 34. The cylinder unit 34 has a first outer cylinder 33 and an inner cylinder 35. The returning element 54 is arranged in the inner cylinder 35. The piston rod 32 can be reciprocated inside the inner cylinder 35. FIG. 5 illustrates the piston-cylinder unit in the initial position. FIG. 6 illustrates the piston cylinder unit with the piston rod 32 extracted. When extracting the piston rod 32 from the cylinder unit 34, he returning element 54 formed by a compression spring is compressed inside the inner cylinder 35. Thus, the piston rod 32 is extracted from the inner cylinder 35 and thus from the piston-cylinder unit 34 against the spring force of the returning element 54, whereby the insertion tool 28 is allowed to pivot in the first pivoting direction 42 as the device travels on in the traveling direction A.

As soon as the insertion tool 28 is pulled from the soil in normal operation, the piston rod 32 is inserted back into the cylinder unit 34 and thus into the inner cylinder 35 by the spring force of the returning element 54, resulting in the insertion tool 28 pivoting in the second pivoting direction 43 about the pivot axis 24 back into the initial position. When reaching the initial position, the free end 32a of the piston rod 32 hits the stop element 58 and the movement of the piston rod 32 is limited.

The spring means 52 is coupled to the inner cylinder 35. The spring means 52 is biased with a defined pre-tensioning force. Only when a predetermined force acts on the insertion tool 28 and the insertion tool pivots in the direction of the second pivot axis 42 and the piston rod abuts against the stop 58, is the spring means 52 compressed. This means that the spring force of the spring means 52 is selected such that the spring means 52 allows the insertion tool 28 to move beyond the initial position only when a force is exerted on the insertion tool 28 that exceeds a predetermined force. The pre-tensioning force and thus the spring force of the spring means may be adjustable. When the insertion tool 28 hits a hard object, the piston rod 32 can be moved farther into the cylinder unit 34 against the spring force of the spring means 52, wherein the inner cylinder 35 is moved in the second pivoting direction 43 in the outer cylinder 33. Here, the protrusion 59 of the inner cylinder 35 presses against the spring 52.

The returning element 54 and the spring means 52 thus act on the insertion tool 28 in different directions. The returning element 54 causes the insertion tool 28 to move in the second pivoting direction 43 towards the initial position after pivoting in the soil and leaving the soil. After the insertion tool has pivoted in the second pivoting direction 43 beyond the initial position due to hitting a hard object in the soil, the spring means 52 causes the insertion tool 28 to move back n the first pivoting direction 42 as soon as the insertion tool 28 has left the soil 2.

In the embodiment illustrated only one insertion tool and one tool holder are illustrated at one support arm with an associated returning means, respectively. However, in a soil working device, a plurality of support arms may be arranged side by side, each connected with a tool holder, wherein each tool holder has a returning means associated therewith. One or a plurality of insertion tools may be connected with each tool holder, respectively. The present invention has the advantage that, if only one insertion tool of a tool holder hits a hard object, only the insertion tools associated with this tool holder evade the object due to the spring means in the returning means. The other insertion tools on the other tool holders can be operated normally.

Further, the embodiment illustrated shows an adjustment means 18 which can be pivoted with respect to the machine frame 20. In this manner the pivot axis 16 can be pivoted relative to the machine frame 20, whereby the returning means 12 and thus the tool holder 26 and the insertion tools 28 can be adjusted. Thus, the insertion angle α can be set in the initial position. The adjustment means 18 can be adjusted centrally for all units arranged side by side formed by a tool holder, insertion tools and returning means at the same time. As an alternative, the returning means may also be directly connected with the machine frame in a pivotable manner.

The invention claimed is:

1. A mobile soil working device comprising:
    a machine frame,
    a drive,
    at least one support arm configured to be movable up and down by the drive and pivotably supported by the machine frame,
    at least one insertion tool configured to be pivotable relative to the support arm about a first pivot axis and movable in an upward direction and a downward direction by the support arm, the insertion tool adapted to be inserted into the soil and pulled from the soil,
    wherein, prior to insertion into the soil, the insertion tool is configured to be disposed in an initial position under a predefined insertion angle, and is configured to carry out a pivot movement from the initial position, the pivot movement being superposed over up-and-down movement of the insertion tool, about the first pivot axis in a first pivoting direction in the soil on the basis of movement of the machine frame in a direction of travel,
    at least one returning mechanism which is coupled to the machine frame at a first end and to the insertion tool at a second end, the returning mechanism having a first biasing element and a second biasing element, wherein the first biasing element is a returning element configured to move the insertion tool back into the initial position by pivoting the insertion tool in a second pivoting direction opposite the first pivoting direction after the insertion tool exits the soil,
    wherein the second biasing element is an independent spring device in addition to the returning element, said spring device allowing the insertion tool to be pivoted in the second pivoting direction beyond the initial position such that the insertion tool is pivoted in the second pivoting direction beyond the initial position upon hitting a hard object in the soil.

2. The soil working device of claim 1, wherein the insertion tool is pivotable against the spring force of the spring mechanism when being pivoted in the second pivoting direction beyond the initial position.

3. The soil working device of claim 1, wherein the returning mechanism has a stop that limits the pivoting of the insertion tool in the second pivoting direction when the initial position is reached.

4. The soil working device of claim 1, wherein the returning mechanism is a piston-cylinder unit wherein the first biasing element and the second biasing element are concentrically arranged.

5. The soil working device of claim 1, wherein the returning mechanism designed as a piston-cylinder unit extends substantially parallel to the support arm.

6. The soil working device of claim 1, wherein the spring mechanism is a compression spring.

7. The soil working device of claim 1, wherein the returning mechanism is coupled to the machine frame through an adjustment mechanism, wherein, by means of the adjustment mechanism, the insertion angle is adjustable in the initial position of the insertion tool.

8. The soil working device of claim 1, wherein at least one tool holder is provided for the at least one insertion tool, said tool holder being supported about the first pivot axis in the support arm adapted to be moved up and down by the drive.

9. The soil working device of claim 8, wherein a plurality of insertion tools are fastened on the tool holder.

10. The soil working device of claim 8, wherein a plurality of tool holders are arranged side by side, each having a plurality of insertion tools fastened thereon, wherein one returning mechanism is coupled to the tool holder, respectively.

11. A method for working a soil comprising:
pulling or driving a soil working device over a soil surface,
inserting at least one insertion tool, coupled to a machine frame, into the soil and pulling it out of the soil,
wherein, prior to insertion, the insertion tool is in an initial position under a predetermined insertion angle and, due to the movement of the machine frame in the traveling direction, the insertion tool performs a pivot movement in the soil about a first pivot axis in a first pivoting direction, the pivot movement being superposed with the upward and downward movement,
wherein the insertion tool, after having left the soil, is returned to the initial position by at least one returning element, being a first biasing element arranged in at least one returning mechanism, by pivoting the insertion tool in a second pivoting direction opposite to the first pivoting direction, wherein the returning mechanism is coupled to the machine frame at a first end and is coupled to the insertion tool at a second end,
wherein a spring mechanism, being a second biasing element arranged in the returning mechanism, allows a pivoting of the insertion tool beyond the initial position in the second pivoting direction, when the tool hits a hard object in the soil.

12. The method of claim 11, wherein the insertion tool is pivoted against the spring force of the spring mechanism when being pivoted in the second pivoting direction beyond the initial position.

\* \* \* \* \*